(12) United States Patent
Kamath

(10) Patent No.: US 9,406,305 B2
(45) Date of Patent: Aug. 2, 2016

(54) MESSAGING BY WRITING AN IMAGE INTO A SPECTROGRAM

(71) Applicant: Digimarc Corporation, Beaverton, OR (US)

(72) Inventor: Ajith M. Kamath, Beaverton, OR (US)

(73) Assignee: Digimarc Corpororation, Beaverton, OR (US)

( * ) Notice: Subject to any disclaimer, the term of this patent is extended or adjusted under 35 U.S.C. 154(b) by 122 days.

(21) Appl. No.: 14/137,663

(22) Filed: Dec. 20, 2013

(65) Prior Publication Data

US 2014/0185862 A1 Jul. 3, 2014

Related U.S. Application Data

(60) Provisional application No. 61/745,516, filed on Dec. 21, 2012.

(51) Int. Cl.
*G06K 9/00* (2006.01)
*G10L 19/018* (2013.01)
*G06Q 20/38* (2012.01)

(52) U.S. Cl.
CPC .......... *G10L 19/018* (2013.01); *G06Q 20/3829* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,873,771 A * | 3/1975 | Kleinerman | ............... | H04J 9/00 348/384.1 |
| 4,989,097 A * | 1/1991 | Yoshio | ................. | H04N 1/3871 386/246 |
| 5,392,223 A * | 2/1995 | Caci | ............................... | 709/218 |
| 5,748,783 A | 5/1998 | Rhoads | | |
| 6,125,172 A * | 9/2000 | August et al. | ............ | 379/110.01 |
| 6,332,030 B1 | 12/2001 | Manjunath et al. | | |
| 6,430,302 B2 | 8/2002 | Rhoads | | |
| 6,674,876 B1 | 1/2004 | Hannigan et al. | | |
| 6,996,521 B2 * | 2/2006 | Iliev et al. | ...................... | 704/200 |
| 7,099,379 B2 * | 8/2006 | Nuytkens et al. | ............. | 375/149 |
| 7,430,302 B2 | 9/2008 | Thorwirth | | |
| 7,684,982 B2 * | 3/2010 | Taneda | .......................... | 704/233 |
| 7,957,977 B2 * | 6/2011 | Zhao et al. | .................... | 704/500 |
| 8,055,499 B2 * | 11/2011 | Sung et al. | .................... | 704/220 |
| 2002/0059059 A1 * | 5/2002 | Iliev et al. | .................. | 704/200.1 |
| 2005/0068589 A1 * | 3/2005 | Inness et al. | ................. | 358/3.28 |

(Continued)

OTHER PUBLICATIONS

Ryuki Tachibana; Shuichi Shimizu; Taiga Nakamura and Seiji Kobayashi "Audio watermarking method robust against time- and frequency-fluctuation", Proc. SPIE 4314, Security and Watermarking of Multimedia Contents III, 104 (Aug. 1, 2001); doi:10.1117/12.435390.

*Primary Examiner* — Anand Bhatnagar
(74) *Attorney, Agent, or Firm* — Digimarc Corporation

(57) ABSTRACT

A message is communicated between devices by passing a host signal, such as an audio signal, with the message written into the spectrogram of the host signal. For host audio signals, the message is authored, converted to an image format (if not already in suitable image form) and written into the spectrogram of the audio signal. The resulting audio signal can be communicated in a variety of ways, but in one particular embodiment, the audio signal is played from a speaker (e.g., of a sending mobile device) and captured through the microphone of a receiving device. The spectrogram of the received audio signal is computed and then rendered to a display screen (e.g., the display of a receiving mobile device).

18 Claims, 7 Drawing Sheets

(56) References Cited

U.S. PATENT DOCUMENTS

| | | | |
|---|---|---|---|
| 2009/0279735 A1* | 11/2009 | Levy | 382/100 |
| 2010/0205628 A1 | 8/2010 | Davis et al. | |
| 2012/0084131 A1 | 4/2012 | Bergel et al. | |
| 2012/0214515 A1 | 8/2012 | Davis et al. | |
| 2013/0268277 A1 | 10/2013 | Duplan | |
| 2013/0275305 A1 | 10/2013 | Duplan | |
| 2013/0336497 A1 | 12/2013 | Duplan et al. | |
| 2014/0142958 A1 | 5/2014 | Sharma et al. | |
| 2014/0258110 A1 | 9/2014 | Davis et al. | |
| 2015/0019230 A1* | 1/2015 | Zhao et al. | 704/500 |

* cited by examiner

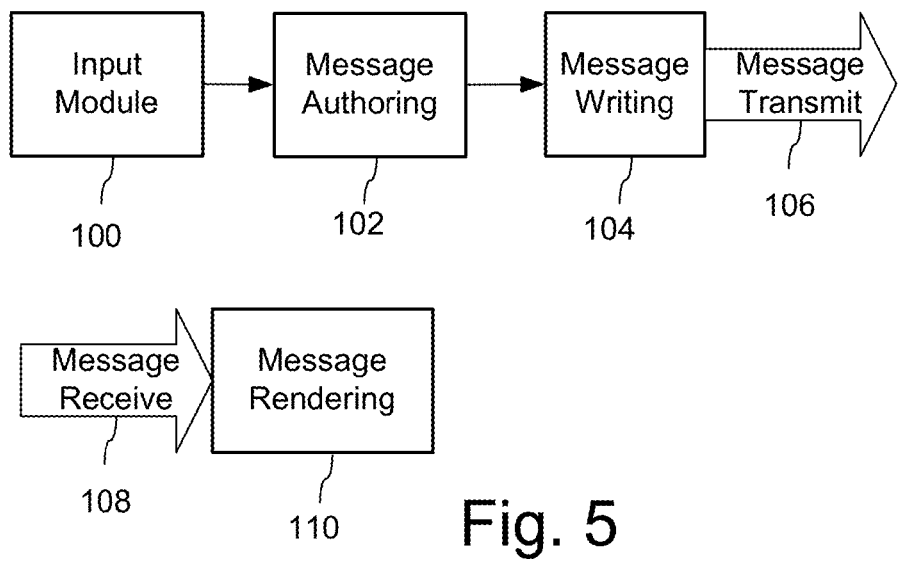
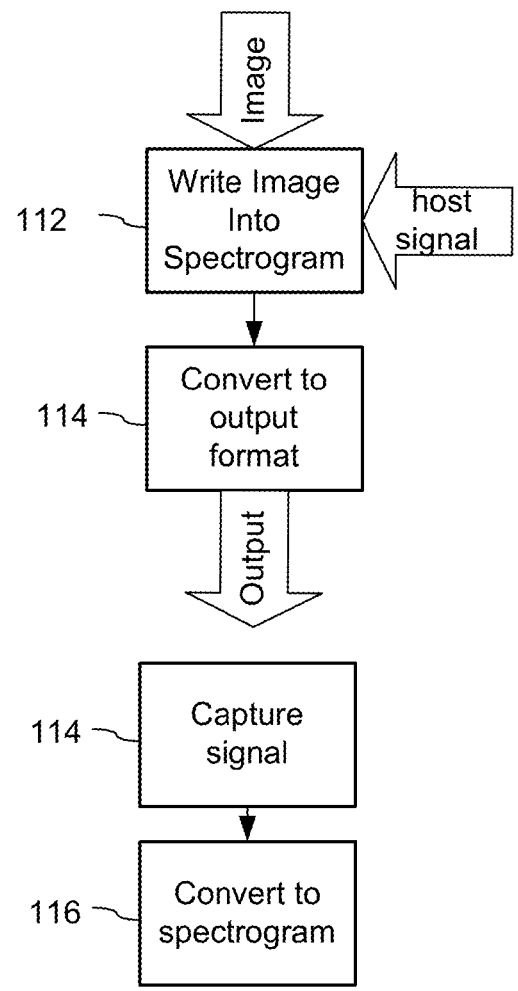
Fig. 5
Fig. 6

MESSAGING BY WRITING AN IMAGE INTO A SPECTROGRAM

RELATED APPLICATION DATA

This application claims benefit of provisional application No. 61/745,516, filed Dec. 21, 2012, and is incorporated herein by reference.

TECHNICAL FIELD

The invention relates to audio signal processing, and in particular, communicating image messages within audio signals.

BACKGROUND AND SUMMARY

Messaging and social networking applications consistently remain among the top mobile device applications (e.g., applications for tablets and smartphones). As the processing power and sophistication of sensors of these devices grow, there are an increasing number of ways to capture and create content and share it with friends. Typically, text, image and video messages are shared directly between devices or indirectly through social networking sites on the Internet.

We have developed a new approach for messaging through audio signals. This approach communicates a message between devices by passing an audio signal with the message written into the spectrogram of the audio signal. The message is authored, converted to an image format (if not already in suitable image form) and written into the spectrogram of an audio signal.

The resulting audio signal can be communicated in a variety of ways. In one particular embodiment, the audio signal is played from a speaker (e.g., of a sending mobile device) and captured through the microphone of a receiving device. In other embodiment, the audio signal is communicated between sending and receiving devices as a voice telephone call, which is communicated via a telecommunication network in any of the ways such voice calls are transmitted (e.g., cellular voice call, voice over IP, public switched telephone network (PSTN), Plain Old Telephone Service (POTS), asymmetric digital subscriber line (ADSL), integrated services digital network (ISDN), or combinations thereof).

To convert the audio signal into a human readable message, the spectrogram of the received audio signal is computed and then rendered to a display screen (e.g., the display of a receiving mobile device).

A similar approach can be applied to insert these types of message in the spectrogram of other host signal types, such as RF signals other EM signals in the EM spectrum.

An advantage of the proposed scheme is that it is insensitive to time scaling (both Linear and Pitch Invariant Time Scaling), audio compression, ambient detection and clock/carrier synchronization between multiple devices. The message may be read by combining with and also independent of any other signaling protocol.

A messaging system includes a message authoring component, a message writing component, message communication components (transmitter and receiver units), and message rendering components. The implementation of each component can be tailored for certain applications and to add features (e.g., various features to create and customize messages and host signals), as appropriate.

Further features of the invention are described in the following detailed description and accompanying drawings.

BRIEF DESCRIPTION OF THE DRAWINGS

FIG. 5 is a block diagram of a messaging system.

FIG. 6 is a flow diagram illustrating processes for messaging in spectrograms.

DETAILED DESCRIPTION

Introduction

Figure 1:
FIG. 1 depicts an example of an image message written into the spectrogram of an audio signal.
Figure 2:
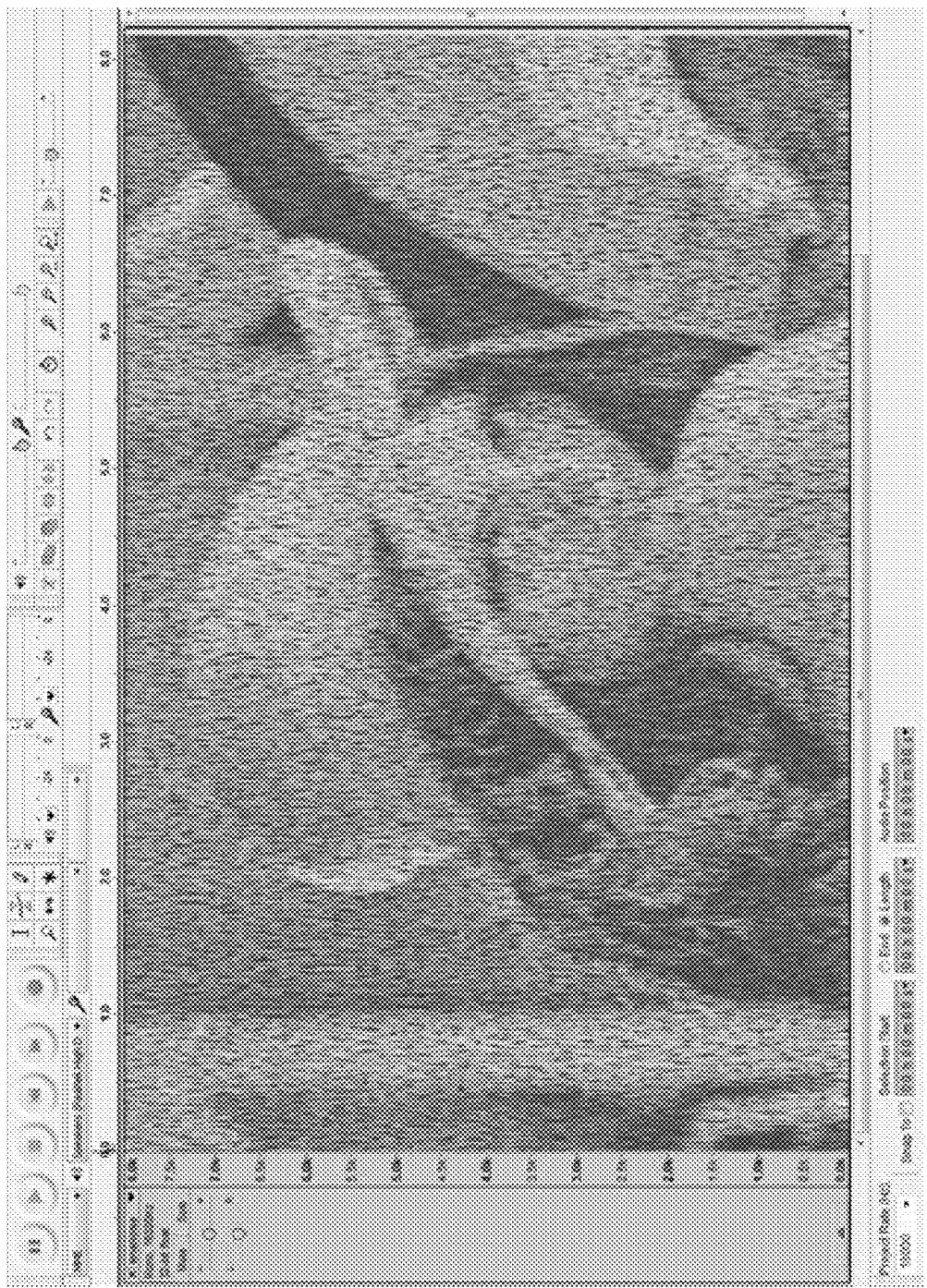
FIG. 2 depicts another example of the image message written into the spectrogram of another audio signal.
Figure 3:
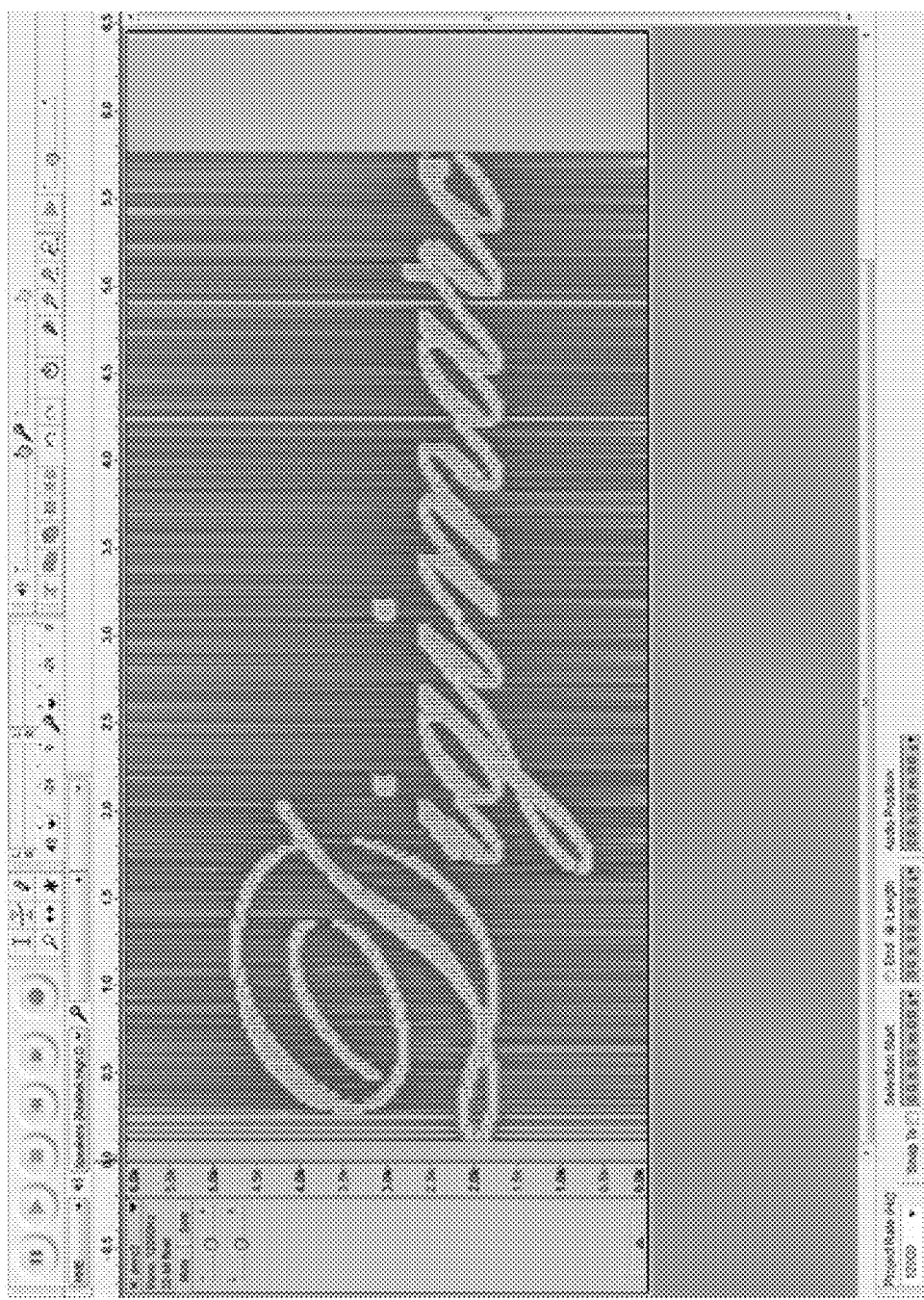
FIG. 3 depicts an alternative example in which text based message is written into the spectrogram of the audio signal depicted in FIG. 1.
Figure 4:
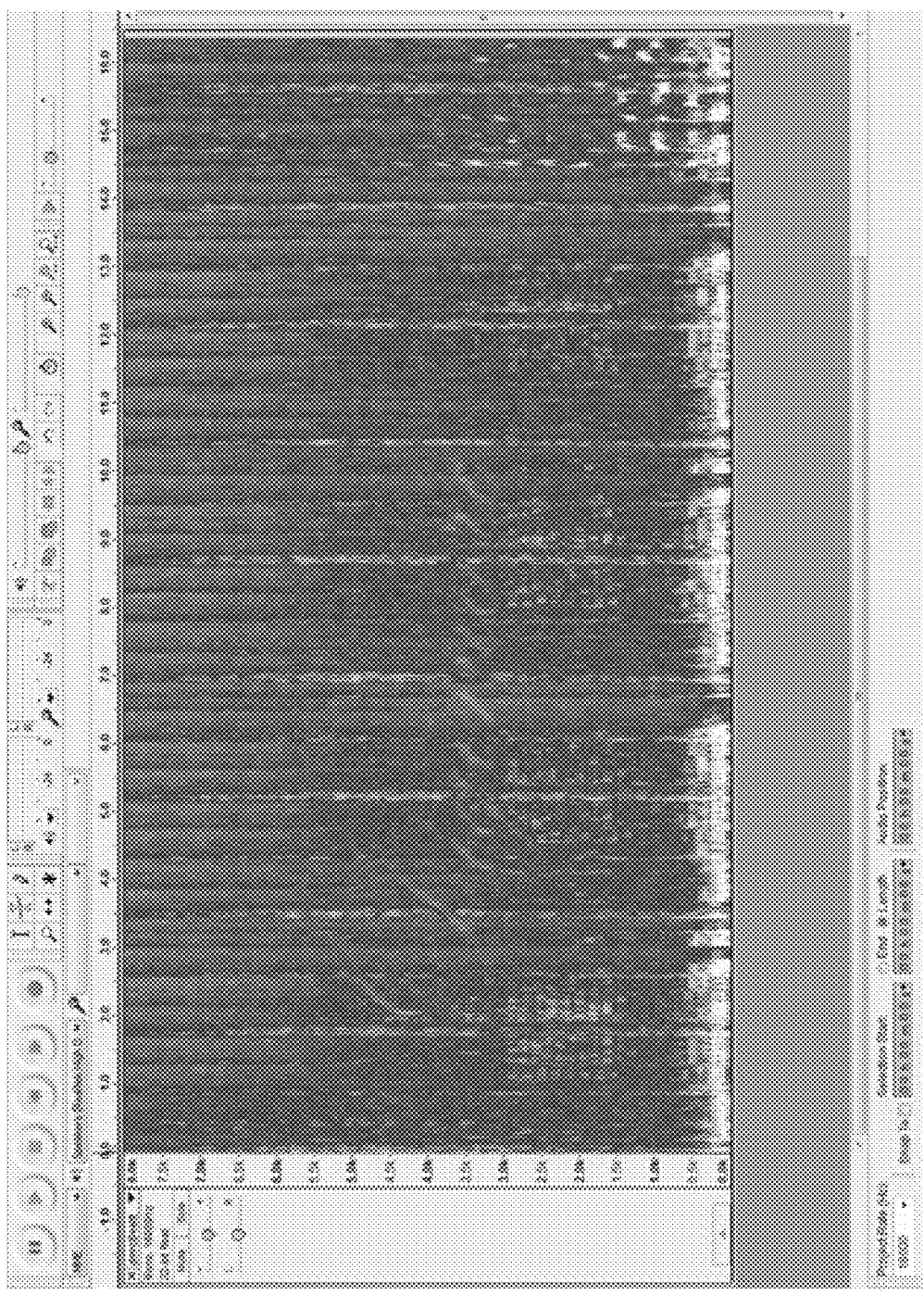
FIG. 4 depicts yet another example of the text message in FIG. 3, but in this case, written into the spectrogram of a music signal.

To provide a quick overview, we start with an illustration of examples of messages written into audio spectrograms shown in FIGS. 1-4. FIG. 1 depicts a screen shot of a spectrogram of an audio signal formed from a Constant Amplitude Zero Auto-Correlation (CAZAC) sequence in which the image, Lena, has been written. FIG. 2 depicts a spectrogram that results from writing an image of Lena to the spectrogram of a pure Additive White Gaussian Noise (AWGN). FIG. 3 depicts a spectrogram that results from writing an image of text to a CAZAC audio signal. Here the text is converted to an image using an image editing application or like software tool. A variety of text font styles and sizes may be used to represent text input by a user to author a message. FIG. 4 depicts a spectrogram of audio with the same image written to the spectrogram of the song, Beat It, by Michael Jackson.

There are five different flavors of this audio messaging system:
  Pure signal: In this case we use a periodic repeating CAZAC signal as the host audio and embed any image onto it. Shown in FIG. 1 and FIG. 3.
  User specified embedding: Here we retain some of the characteristics of the original audio and embed the image on top of it. FIG. 2 is an example of this. In this case, there is a significant audible distortion to the original audio caused by the embedding.
  Covert embedding: Here we minimally distort the original audio to embed the message, and the embedding method may be used as an audio watermarking technique, say, for branding purposes (such as by writing a brand image into the spectrogram). The message could be embedded by:
    adding frequency components (say by mixing the CAZAC embedded pure signal into the base audio stream) or
    Removing frequency components in the original audio, as shown in FIG. 4.
    Embedding in the higher (in-audible) frequency range, say, above 20 kHz for audio.

The audio signals produced by this method may also be embedded with one or more layers of machine readable information using digital watermarking, high frequency audio signaling, audio fingerprinting, and other schemes disclosed in our co-pending application Ser. No. 14/054,492, entitled MULTI-MODE AUDIO RECOGNITION AND AUXILIARY DATA ENCODING AND DECODING (Now published as US Patent Application Publication 20140142958), which is hereby incorporated by reference. Such machine readable information in audio signals may be used at points within the messaging system to control aspects of the system. For example, the machine readable information in the audio signal may be used to identify the signal and communicate message metadata, such as sender ID, receiver IDs, time of sending, as well as control data used to control distribution of, and access to the message.

Once identified, a receiver of that signal may use the identity to look up related metadata for that signal, including control data.

Whether embedded or linked to the audio signal, the control data may include data for controlling distribution or access to a message. For example, the control data may include a key or pointer to a key used to descramble a spectrogram image so that it may be viewable only by authorized recipients. If a user wishes to send the message only to particular neighboring devices within range of the user's audio output device, the image may be scrambled or encrypted and designated for reading by only one or more users by user IDs. Only these users are given access to the key to descramble or decrypt the image written into the spectrogram of the received audio.

In one embodiment of a key distribution service operated by the messaging service, the control data provides a pointer to a network service for distributing keys, which only provides the key to intended recipients after those recipients and/or their devices are authenticated.

The metadata may be encoded in the machine readable information, embedded within the audio signal, such that only intended recipients can decode it. One example is where the receiver has or is provided with a key to decode a digital watermark embedded in the audio that contains this metadata or a pointer to it on a network server. Another example is where the receiver has a key to decode a high frequency audio signal, in which the metadata is encoded. This metadata provides an alternative or complementary means of conveying control data, including descrambling or decryption keys, for controlling access to and distribution of messages in the spectrogram.

The messaging system may also utilize public and private channels of machine readable information embedded in the audio signal. The public channel conveys information intended for reading by all recipients with a compatible messaging system. This may include triggers indicating that a message is being sent, which automatically initiates other message detection and decoding functions on one or more private channels, as well as on any message written into the spectrogram.

Likewise, images written in the spectrogram may be public and private. Public images are those that are viewable by converting received audio into a spectrogram and displaying it. Private images, in contrast, are images that are scrambled or encrypted and written into the spectrogram by the sender. These private images are descrambled or decrypted using the above described method, or like method, for obtaining and applying a key obtained from a key distribution mechanism managed by the messaging system. Key distribution may be handled via a separate network channel connecting a user's device to a key distribution service, or through private machine readable information channels in the audio.

The image conveyed in the spectrogram may be used to complement messages communicated to/from a mobile device for a variety of applications. These applications include not only sharing messages and posting content for social media and networking applications, but also include communications for mobile payment, mobile shopping, navigation (including indoor positioning and navigation), $2^{nd}$ screen television, and various combinations thereof, among other applications. In each of these applications, the spectrogram image may be used to convey a graphic or text to serve as a brand identifier, site key, or other form of graphical or textual notification to alert the user that other services are available or complement a communication channel and/or transaction occurring on a different, but related channel (e.g., in-store wifi, cellular data service, BlueTooth beacons, in-store light modulation, or the like).

For example, in a payment application, the spectrogram image may be used to convey a site key. In one form, a site key comprises a graphic selected by a user to be associated with his or her payment service, and particular user account within that service. For example, when a user accesses his or her account on a payment service, or when the user wishes to use that account to conduct a payment transaction, the site key is presented either by the payment service or other party to the transaction as an additional validation for the user that the correct payment service associated with his or her account (e.g., the one selected on his mobile device) is participating in the communication or transaction. The site key may be sent by a Point of Sale (POS) terminal to the user's mobile device using the techniques described and incorporated in this document to add another layer of verification that the correct payment service and user account is being applied in the payment transaction.

For example, a user selects a payment service on his or her mobile device, and the mobile device initiates the transaction with that service via a network connection to that service. The network service then communicates with the vendor's payment system. As part of this transaction, the network service routes the site key back to the user's mobile device and/or to the vendor's POS system, where in both cases, the site key transmittal to the user provides a quick way for the user to confirm the correct account and service is involved in the transaction. In one path of routing the site key to the user's mobile device, a speaker in the POS system transmits the site key to the user's mobile device, e.g., via a site key graphic written into the spectrogram of an audio signal played from the speaker. The user can select the site key uniquely for each transaction on his or her mobile device and send it to the payment service as part of the communication to initiate the transaction. By getting a matching or corresponding site key back from the vendor, the user can have an added level of confidence that the correct payment service and user account for that service has been selected and is properly communicating with the vendor to complete the transaction.

In another path of routing the site key, the user's payment service routes the site key and transaction specific information back to the user's mobile device, in response to the user initiating a transaction between his mobile device and the vendor's POS terminal. The unique signaling that the user conveys to the POS, via an audio channel from the speaker of the mobile device to a microphone in the POS, provides another means for the user to communicate transaction preferences and associated authentication information, and then receive corresponding validation of those preferences and authentication information, confirming that the vendor's system is interacting with the payment service and account that the user seeks to use and authorize for the transaction.

Thus, the signaling methods in this document may be used in various communication paths of the transaction processing method, including communication paths for challenge queries and responses for authentication between user's mobile device and a payment service network and/or vendor POS. These include from user mobile device to POS, from POS to mobile device, with complementary communication through other channels between POS and user's payment service, and mobile device to user's payment service. These signaling methods may be used in combination with the audio signaling and other signaling methods and payment methods described in our co-pending application Ser. No. 14/074,072, entitled METHODS AND ARRANGEMENTS FOR SMARTPHONE PAYMENTS AND TRANSACTIONS (Now published as US Patent Application Publication 20140258110), which is hereby incorporated by reference. These signaling and payment processing methods may be incorporated into other payment schemes, such as those described in 20130275305, 20130336497, and 20130268277, which are hereby incorporated by reference.

Audio signaling, including use of the audio signal's spectrogram to convey images and text to humans at POS terminal or mobile device screen, can be designed to be tailored to user, vendor or payment service preferences. In particular, these could be pleasing audio tones, arranged in a signal to convey and audio trademark or brand identifier. Similarly, in a challenge response mode of communication from or to the mobile device, the user may select a challenge tone or collection of tone sequences (or song) in an authoring module, and designate that user-created sequence of tones to be played by the user's device to conduct a payment Likewise, the user can also configure the challenge response tone sequence that the user expects to hear in response to the challenge tone sequence to complete the transaction. Complementary challenge and response graphics may be communicated in the audio signal's spectrogram or machine readable information channels.

Layered audio signal communication supports a combination of private and public channels, machine readable audio codes, human pleasing audio tone sequences or songs, and human-readable graphics written into the audio signal's spectrogram. Interlinking these channels as well as challenge/response messages, provides added authentication capability, as transactions can be required to satisfy particular relationships between the signals in these layers of communication, and audio challenge and response signals, to be valid.

In a similar fashion, various shopping and entertainment venues can use such a graphical prompt or notification conveyed via ambient audio signals with mobile devices to notify a user that particular services or product or service offerings, discounts, promotions, etc. are available. The graphical prompt, when displayed on the user's mobile device, provides a quick and effective way for the user to check that certain services are available that may be of interest. The user can use the site key construct to opt into receiving notifications. In this role, the site key displayed with a notification triggered from audio transmitted by a venue indicates that a service is available and it is one that he or she has opted into. First, the presence of the user is detected and authenticated by any number of communication channels between the user's mobile device and the venue, including for example, a private audio channel, low power BlueTooth signal, or wi-fi signal, to name a few options. Then the audio channel may be used to provide notifications of services that the user was opted into, as determined by the link between the user's authenticated identity, and the user's pre-selected opt in preferences. Different site key graphics can be assigned to prioritize or categorize different types of offers, and included in audio signal notifications sent to the user's device via speakers in venues where they are available.

Techniques described in the patent documents incorporated by reference herein may be used in complementary fashion with the techniques and applications described in this document. One complementary field is described in co-pending application, 61/819,506, entitled WATERMARKING AND SIGNAL RECOGNITION FOR MANAGING POSTING AND SHARING OF CONTENT CAPTURED BY USERS, which is hereby incorporated by reference. This application describes low latency audio encoding for public performances, among other technologies, which may be used in combination with the audio signaling technology of this document.

Another complementary application for the techniques described in this document is mobile device positioning and navigation, as well as uses of these technologies for shopping. The techniques described herein may be used in combination with the shopping and mobile device positioning/navigation applications described in 61/913,215, and US Patent Publication 20120214515, which are hereby incorporated by reference.

Another complementary field of technology that may be used in combination with the technology in this document is second screen television. Please see our co-pending application, published as US Patent Publication 20100205628, which is hereby incorporated by reference.

FIG. 5 is a block diagram illustrating components of a messaging system. Block 100 represents a module for inputting a message. This module comprises an input device (e.g., keyboard, touch screen, audio, video or image sensor, etc.) and associated software or firmware facilitating capture, digitization and storage of information. There are two primary components of the messaging: a host signal, which is the audio in the above examples of FIGS. 1-4, and data used to author the image to be written into the spectrogram of the host signal.

Message Authoring

Message authoring module 102 constructs the image message from the above data input. It is implemented as a software program (e.g., as a program that is part of the operating system or application program) that operates together with the input module to receive data and facilitate editing of this data, possibly by the user or image enhancement and editing functions. The user can enter an image based message directly by importing an image from a local or remote file directory or capturing an image with the camera of a mobile device. The user can also enter other forms of data that are transformed into an image based message. Examples include entering text input that is rendered into image form using a selected font. The text input may be entered via a keyboard, touch screen or voice recognition (speech to text conversion). The user may also draw a message by hand via gesture, touch screen or other "free hand" drawing tools to form letters, symbols or other picture or graphic elements by motion of a finger or stylus, which in turn, may be directly captured as an image of the path traversed by the user's finger/stylus, enhanced to clean up the image by smoothing or sharpening edges, and/or converted to characters in a selected font after being recognized via character recognition.

Message Writing

Message writing module 104 takes the message, now in image form from the message authoring module 102, and writes it into the spectrogram of a host audio signal. The host audio signal may be selected from a menu list of host audio signals, adapted from a pre-selected list of host audio signals, or generated from an audio signal provided by the user. Preferably, the spectral content of the audio signal is pre-conditioned to receive the message so that the message is readily recognizable after being written into the spectrogram. Examples of adapted audio signals are signals generated by enabling the user to customize an audio signal by adding special audio effects, such as mixing in sounds of instruments, singing (e.g., including songs sung into the device's microphone, etc.), adding echoes or reverb, etc. If not already pre-computed, the message writing module also converts the host audio signal into a spectrogram, and provides pre-conditioning by adding spectral content over a message writing area within the spectrogram. This can be achieved by spreading the host audio signal content, such as by inserting harmonics, so that the human recognizable characteristics of the host audio are retained, yet the output audio has sufficient information content to receive the message. After writing the message into the spectrogram, the spectrogram is converted to an audio signal suitable for play out, transmission or storage (converted to a standard audio signal and file format, possibly compressed to reduce its size).

Message Communication

Message communication modules are transmitter/receiver components and associated control circuitry and software for transmitting and receiving a host signal with an inserted message.

Referring to FIG. 5, message transmission unit 106 is a component in a user's device that transmits the host signal (with message inserted). In the case of a host audio signal, the audio signal can be played out of a device speaker, or transmitted as an electronic signal via various wire or wireless signal communication methods. A particular user application for a mobile device is to play the host audio from one mobile device, and capture in a nearby device or devices via microphone in the receiving device(s).

Message receive unit 108 receives the host audio signal and converts it into a form for further processing and rendering of the spectrogram.

Message communication can be point to point, from a single transmitter to a single receiver over a public or private channel. It may also be a form of broadcast, e.g., one transmitter to many receivers. In the example of a smartphone or other mobile device sharing audio "tweets" with another device, there is typically one transmitting mobile device and one or more neighboring receiving mobile devices.

In particular, as depicted in FIG. 6 for example, one user authors a message (e.g., an image) on her phone with a mobile application program, and the mobile application writes it into the spectrogram of a host audio signal, as shown in block 112. The application converts the spectrogram to an output audio signal format (e.g., way file) in block 114 and plays that audio signal.

A neighboring device captures the audio via its microphone (signal capture block 114).

A user may also post a message to a sharing, hosting or social networking site, which may be visited by others, where it is played and captured by the devices visiting the site.

Message Rendering

Referring back to FIG. 5, message rendering 110 is the process of converting the received signal into a spectrogram and displaying the spectrogram. This can be accomplished using a mobile application that receives audio from the receiving device's microphone, converts it to a spectrogram, and displays the spectrogram as shown in block 116 in FIG. 6. One such mobile application that receives an audio signal captured through a mobile device's microphone and converts it to an image representation of the spectrogram is called SpectrumView realtime spectrogram and spectrum analysis application for the iPhone, available through the Apple App Store, from Oxford Wave Research, LTD, of Oxford, UK.

Figure 7:
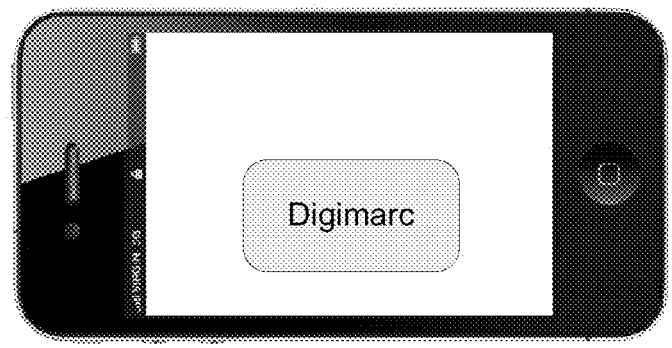
FIG. 7 is a diagram illustrating components of a mobile telephone device in which components of the message system and method may be implemented.
Figure 7:

FIG. 7 illustrates an example of the sender mobile device on the top, capturing a user's input message (a text message of "Digimarc"), and the receiver's mobile device displaying a stylized rendering of the message that has been inserted into the spectrogram of a host audio, sent to the receiver, and the corresponding spectrogram rendered to an image display.

The spectrogram, including the visual message depicted within it, may be displayed in real-time or near real time as the audio is being received. For example, in the SpectrumView mobile application, the spectrogram of an audio signal is displayed in a scrolling fashion as that audio signal is being received (e.g., ambient audio captured through a microphone or incoming audio from a telecommunication channel, such as a voice call). This provides the capability for users to convey messages that are time varying and have a limited lifetime corresponding to the time period in which the message is visible on the display screen of the device. User screen capture of such a message can be limited to a portion of the message that is displayed at a particular point in time. The application can be adapted to depict a static image, or a moving image, based on options set by the sender or receiver.

Matlab Code

The following is an example of an implementation in Malab code. It can be used to embed an image into the spectrogram of a default CAZAC (swept sine) sequence or the spectrogram of any specified cover music, preferably after pre-conditioning of that cover music.

Code:

```
function [wav] = embedImageSpectrogram(imlink, coverLink)
im = double(imread(imlink)); % read input image
if isempty(coverLink) % Use CAZAC audio as default cover if no audio
file is specified
    % CAZAC: Constant Amplitude Zero Autocorrelation Sequence
    % P has to be a prime number to have constant amplitude property.
    % Non-prime values of P can be used as well
    P = 257;cover(1:P) = fliplr(exp(-1i*pi*(0:(P-1)).*(1:P)/P));
    cover = repmat(cover', 1,size(im,2));
    sgram = fft(cover,256,1);
else
    inwav = wavread(coverLink); % read the specified audio file
    cover = reshape(inwav(1:512*size(im,2)), 512, size(im,2));
    sgram = fft(cover,512,1);
    sgram(257:end, :) = 0;
    sgram = sgram./sqrt(mean(abs(sgram(:))) + abs(sgram).^2 ); %
preconditon the spectrogram to be semi-flat
end
sgram(1:256,:) = sgram(1:256,:).*flipud(im); % apply image amplitude to
cover spectrogram
% convert spectrogram back to time domain
ff = real(ifft(sgram,512));
wav = ff(:)/max(ff(:));
```

Usage Commands:

```
wav = embedImageSpectrogram('lena2.tif','BeatItBase_16k.wav');
wavwrite(wav(:)/max(wav(:)), 16e3, 'lenaBeatIt.wav');
```

System and Components

It is envisioned that the above processes, systems and system components can be implemented in a variety of computing environments and devices. It is specifically contemplated that the processes and components will be implemented within devices and across multiple devices. For example, message capture, authoring, writing, and transmission may be performed by one or more devices of a user who originates a message (on his or her smartphone, which transmits a host signal to another device directly, or indirectly through social networking or other message distribution channels). Message reception and rendering is typically performed within a receiving device (e.g., a receiving mobile device), but it can also be distributed (e.g., replicated across several device under a user's control or associated with a particular messaging service account).

The computing environments used to implement the processes and system components encompass a broad range from general purpose, programmable computing devices to specialized circuitry, and devices including a combination of both. The processes and system components may be implemented as instructions for computing devices, including general purpose processor instructions for a variety of programmable processors, including microprocessors, Digital Signal Processors, etc. These instructions may be implemented as software, firmware, etc. These instructions can also be converted to various forms of processor circuitry, including programmable logic devices, application specific circuits, including digital, analog and mixed analog/digital circuitry. Execution of the instructions can be distributed among processors and/or made parallel across processors within a device or across a network of devices. Transformation of content signal data may also be distributed among different processor and memory devices.

The computing devices include, as necessary, one or more processors, one or more memories (including computer readable media), input devices, output devices, and communication among these components (in some cases referred to as a bus). For software/firmware, instructions are read from computer readable media, such as optical, electronic or magnetic storage media via a communication bus, interface circuit or network and executed on one or more processors.

The above processing of content signals includes transforming of these signals in various physical forms. Images and video (forms of electromagnetic waves traveling through physical space and depicting physical objects) may be captured from physical objects using cameras or other capture equipment, or generated by a computing device. Similarly, audio pressure waves traveling through a physical medium may be captured using an audio transducer (e.g., microphone) and converted to an electronic signal (digital or analog form). While these signals are typically processed in electronic and digital form to implement the components and processes described above, they may also be captured, processed, transferred and stored in other physical forms, including electronic, optical, magnetic and electromagnetic wave forms. The content signals are transformed during processing to compute signatures, including various data structure representations of the signatures as explained above. In turn, the data structure signals in memory are transformed for manipulation during searching, sorting, reading, writing and retrieval. The signals are also transformed for capture, transfer, storage, and output via display or audio transducer (e.g., speakers).

While reference has been made to mobile devices (like cell phones) and embedded systems, it will be recognized that this technology finds utility with all manner of devices—both portable and fixed. PDAs, organizers, portable music players, desktop or tablet computers, wearable computers, servers, etc., can all make use of the principles detailed herein. Particularly contemplated cell phones include the Apple iPhone, and cell phones following Google's Android specification (e.g., the G1 phone, manufactured for T-Mobile by HTC Corp.). The term "cell phone" should be construed to encompass all such devices, even those that are not strictly-speaking cellular, nor telephones. (Details of the iPhone, including its touch interface, are provided in published patent application 20080174570.)

Figure 8:
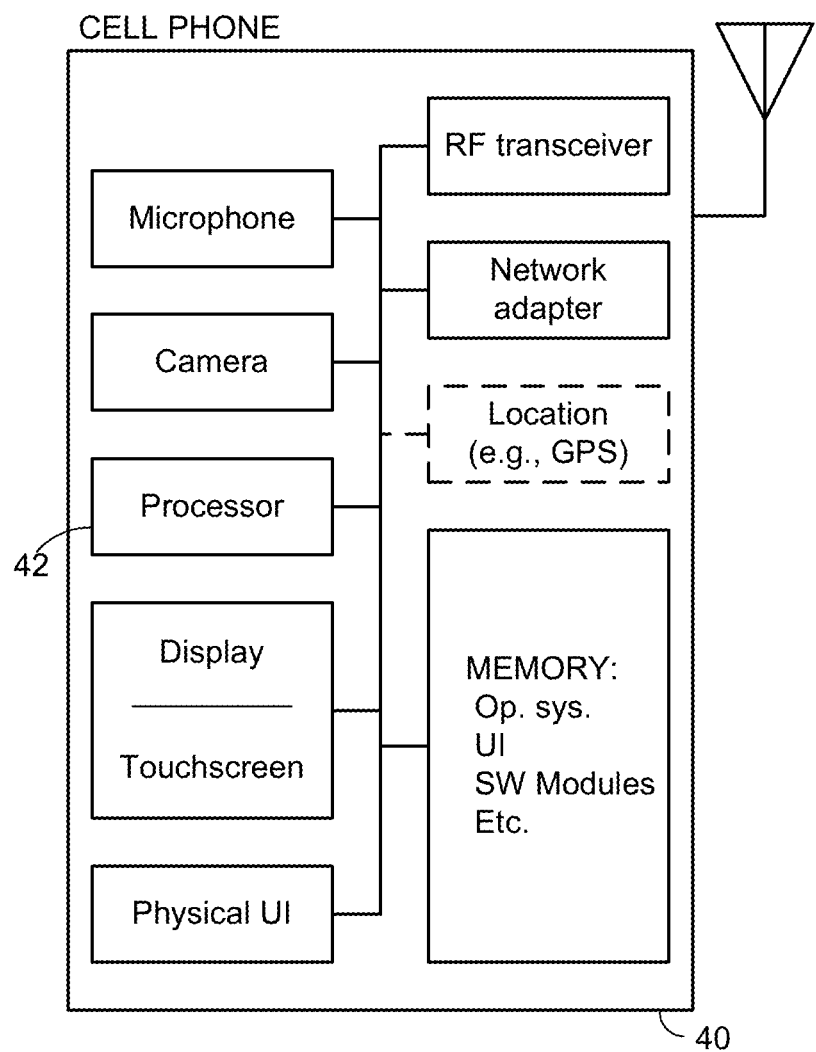
FIG. 8 depicts a block diagram of a mobile device for implementing aspects of the invention.

The design of cell phones and other computers that can be employed to practice the methods of the present disclosure are familiar to the artisan. In general terms, each includes one or more processors, one or more memories (e.g. RAM), storage (e.g., a disk or flash memory), a user interface (which may include, e.g., a keypad, a TFT LCD or OLED display screen, touch or other gesture sensors, a camera or other optical sensor, a microphone, etc., together with software instructions for providing a graphical user interface), a battery, and an interface for communicating with other devices (which may be wireless, such as GSM, CDMA, W-CDMA, CDMA2000, TDMA, EV-DO, HSDPA, WiFi, WiMax, or Bluetooth, and/or wired, such as through an Ethernet local area network, a T-1 internet connection, etc.). An exemplary cell phone 40 that can be used to practice part or all of the detailed arrangements is shown in FIG. 8.

The processor 42 can be a special purpose hardware device, or may be implemented by a programmable device executing software instructions read from a memory or storage, or by combinations thereof. (The ARM series of CPUs, using a 32-bit RISC architecture developed by Arm, Limited, is used in many cell phones.) References to "processor" should thus be understood to refer to functionality, rather than any particular form of implementation.

In addition to implementation by dedicated hardware, or software-controlled programmable hardware, the processor can also comprise a field programmable gate array, such as the Xilinx Virtex series device. Alternatively the processor may include one or more digital signal processing cores, such as Texas Instruments TMS320 series devices.

Software instructions for implementing the detailed functionality can be readily authored by artisans, from the descriptions provided herein.

Typically, devices for practicing the detailed methods include operating system software that provides interfaces to hardware devices and general purpose functions, and also include application software that can be selectively invoked to perform particular tasks desired by a user. Known browser software, communications software, and media processing software can be adapted for uses detailed herein. Some embodiments may be implemented as embedded systems—a special purpose computer system in which the operating system software and the application software is indistinguishable to the user (e.g., as is commonly the case in basic cell phones). The functionality detailed in this specification can be implemented in operating system software, application software and/or as embedded system software.

Different of the functionality can be implemented on different devices. For example, in a system in which a cell phone communicates with a server at a remote service provider, different tasks can be performed exclusively by one device or the other, or execution can be distributed between the devices. For example, messages can be authored and communicated to other devices by servers in a cloud computing service by uploading message and host image content to servers in a cloud service or authored in a mobile device via a script program downloaded from an online authoring service provided from a network server. Also, messages and host signals may be stored on the cell phone—allowing the cell phone to write messages into host signals, transmit them, receive them, and render them—all without reliance on externals devices. Thus, it should be understood that description of an operation as being performed by a particular device (e.g., a cell phone) is not limiting but exemplary; performance of the operation by another device (e.g., a remote server), or shared between devices, is also expressly contemplated. (Moreover, more than two devices may commonly be employed. E.g., a service provider may refer some tasks, functions or operations, to servers dedicated to such tasks.) In like fashion, data can be stored anywhere: local device, remote device, in the cloud, distributed, etc.

Operations need not be performed exclusively by specifically-identifiable hardware. Rather, some operations can be referred out to other services (e.g., cloud computing), which attend to their execution by still further, generally anonymous, systems. Such distributed systems can be large scale (e.g., involving computing resources around the globe), or local (e.g., as when a portable device identifies nearby devices through Bluetooth communication, and involves one or more of the nearby devices in an operation.)

Concluding Remarks

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the signal processing operations for capturing, authoring, communicating and rendering messages or host signals may be implemented as instructions stored in a memory and executed in a programmable computer (including both software and firmware instructions), implemented as digital logic circuitry in a special purpose digital circuit, or combination of instructions executed in one or more processors and digital logic circuit modules. The methods and processes described above may be implemented in programs executed from a system's memory (a computer readable medium, such as an electronic, optical or magnetic storage device). The methods, instructions and circuitry operate on electronic signals, or signals in other electromagnetic forms. These signals further represent physical signals like image signals captured in image sensors, audio captured in audio sensors, as well as other physical signal types captured in sensors for that type. These electromagnetic signal representations are transformed to different states as detailed above to encode and decode digital data signals, enhance images and audio signals, perform image or audio recognition (character recognition, voice recognition, image or audio recognition, etc.), and to transmit and receive messages and host signals. The above methods, instructions, and hardware operate on reference and suspect signal components. As signals can be represented as a sum of signal components formed by projecting the signal onto basis functions or spectral representations (e.g., various techniques to compute spectrograms and like time-frequency representations of host signals), the above methods generally apply to a variety of signal types. The Fourier transform, for example, represents a signal as a sum of the signal's projections onto a set of basis functions.

The particular combinations of elements and features in the above-detailed embodiments are exemplary only; the interchanging and substitution of these teachings with other teachings in this and the incorporated-by-reference patents/applications are also contemplated.

I claim:

1. A messaging method comprising:
   providing an image;
   writing the image into a spectrogram of a host signal to produce a modified host signal; and transferring the modified host signal, in which a human readable message is conveyed by the image within the spectrogram; wherein providing an image comprises taking image-based message input from a user via a user input device, and producing a corresponding two dimensional image; and wherein the host signal comprises a host audio signal.

2. The method of claim 1 wherein the writing comprises inserting the two dimensional image into the spectrogram of the host audio signal by modifying frequency components in the spectrogram, such that the two dimensional image is visible to a human when the spectrogram is generated and displayed as a two dimensional image on a display device.

3. The method of claim 2 further comprising:
   obtaining the host audio signal in response to selection by a user.

4. The method of claim 3 wherein the host audio signal comprises a song selected by the user.

5. The method of claim 3 wherein the host audio signal comprises audio input captured from a user via a microphone.

6. The method of claim 5 further including: modifying the host audio signal with special effects selected by a user prior to inserting the two dimensional image into the spectrogram of the host audio signal.

7. The method of claim 2 including: preconditioning the spectrogram before inserting the two dimensional image into the spectrogram by adding spectral content into the spectrogram in an area of the spectrogram where the two dimensional image is to be written.

8. The method of claim 1 further including converting the modified host signal into an audio signal and sending the audio signal to a speaker to produce audio output for device to device message communication.

9. The method of claim 1 implemented in a mobile device application executing on a mobile device, the mobile device application including a message authoring module, executing on the mobile device, enabling a user to author a message and providing that message in image form as the image, and a message writing module, executing on the mobile device, for writing the image into a spectrogram of a host audio signal.

10. The method of claim 9 wherein the mobile device application further includes a message rendering module, executing on the mobile device, for receiving an audio signal captured by a microphone of the mobile device, converting the captured audio signal into a spectrogram and sending the spectrogram in image form to a display device on the mobile device for display.

11. The method of claim 1 wherein the transferring comprises transferring to a messaging network service in which the modified host signal is posted, and is made available for one or more destination devices.

12. A message rendering method comprising:
   receiving an audio signal;
   converting the audio signal into a spectrogram;
   rendering the spectrogram for display, wherein an image written into the spectrogram is displayed, the image having been written into the spectrogram by inserting an array of two dimensional image elements to corresponding two dimensional time-frequency locations within the spectrogram.

13. The method of claim 12 wherein the receiving comprises receiving the audio signal from a microphone of a mobile device, the microphone capturing the audio signal from a neighboring device in which the image was written into the spectrogram of the audio signal.

14. The method of claim 12 wherein the receiving comprises receiving a voice telephone call over a telecommunications network.

15. The method of claim 12 wherein the receiving, converting and rendering is performed by a mobile application, executing on a mobile device, and the mobile application including a message authoring module, executing on the mobile device, enabling a user to author a message and providing that message in image form as the image, and a message writing module, executing on the mobile device, for writing the image into a spectrogram of a host audio signal.

16. The method of claim 12, further including:
decoding machine readable information from a private channel in the audio signal, and using the machine readable information to determine authorized recipient of the image written into the spectrogram.

17. The method of claim 12, further including:
decoding machine readable information from a private channel in the audio signal to extract control data for determining whether a recipient has access to view the image; and
decoding machine readable information from a public channel in the audio signal to control distribution of a message within the spectrogram of the audio signal.

18. A non-transitory computer readable medium, on which is stored instruction, which when executed by one or more processors, perform a messaging method comprising:
providing an image;
writing the image into a spectrogram of a host signal to produce a modified host signal; and transferring the modified host signal, in which a human readable message is conveyed by the image within the spectrogram;
wherein providing an image comprises taking image-based message input from a user via a user input device, and producing a corresponding two dimensional image;
wherein the host signal comprises a host audio signal; and
wherein the writing comprises inserting the two dimensional image into the spectrogram of the host audio signal by modifying frequency components in the spectrogram, such that the two dimensional image is visible to a human when the spectrogram is generated and displayed as a two dimensional image on a display device.

* * * * *